United States Patent
Feijoo

(10) Patent No.: US 11,586,685 B2
(45) Date of Patent: Feb. 21, 2023

(54) SYSTEMS AND METHODS FOR GENERATING DATA STRUCTURES FROM BROWSER DATA TO DETERMINE AND INITIATE ACTIONS BASED THEREON

(71) Applicant: CITRIX SYSTEMS, INC., Fort Lauderdale, FL (US)

(72) Inventor: Ricardo Fernando Feijoo, Fort Lauderdale, FL (US)

(*) Notice: Subject to any disclaimer, the term of this patent is extended or adjusted under 35 U.S.C. 154(b) by 121 days.

(21) Appl. No.: 16/669,901

(22) Filed: Oct. 31, 2019

(65) Prior Publication Data

US 2021/0133257 A1    May 6, 2021

(51) Int. Cl.
G06F 16/951 (2019.01)
G06F 16/958 (2019.01)
G06F 16/954 (2019.01)

(52) U.S. Cl.
CPC .......... *G06F 16/951* (2019.01); *G06F 16/954* (2019.01); *G06F 16/972* (2019.01)

(58) Field of Classification Search
CPC .... G06F 21/604; G06F 16/951; G06F 16/972; G06F 16/954
See application file for complete search history.

(56) References Cited

U.S. PATENT DOCUMENTS

| | | | |
|---|---|---|---|
| 7,490,356 B2 | 2/2009 | Lieblich et al. | |
| 8,151,323 B2 | 4/2012 | Harris et al. | |
| 8,769,063 B2 | 7/2014 | Barton et al. | |
| 8,970,450 B2 | 3/2015 | Momchilov | |
| 10,404,698 B1* | 9/2019 | Natarajan | H04L 67/143 |
| 2012/0226742 A1 | 9/2012 | Momchilov et al. | |
| 2014/0331333 A1 | 11/2014 | Frost | |
| 2016/0099963 A1* | 4/2016 | Mahaffey | H04W 12/12 726/25 |
| 2016/0224320 A1* | 8/2016 | Jemiolo | G06Q 50/01 |
| 2019/0018717 A1 | 1/2019 | Feijoo et al. | |
| 2019/0068627 A1* | 2/2019 | Thampy | H04L 63/1416 |
| 2019/0095599 A1 | 3/2019 | Iliofotou et al. | |
| 2019/0260795 A1* | 8/2019 | Araiza | H04L 63/14 |

(Continued)

FOREIGN PATENT DOCUMENTS

| | | |
|---|---|---|
| WO | WO 2015/070260 | 5/2015 |
| WO | WO 2017/205239 | 11/2017 |

OTHER PUBLICATIONS

Pacheco et al: "Anomaly Behavior Analysis for IoT Network Nodes" Future Networks and Distributed Systems: ACM, 2 Penn Plaza, Suite 701 New York NY1 0121-0701 USA, Jul. 1, 2019 (Jul. 1, 2019 ), pp. 6.

(Continued)

*Primary Examiner* — Amresh Singh
*Assistant Examiner* — Courtney Harmon

(57) ABSTRACT

A computing device may include a memory and a processor configured to cooperate with the memory to receive data from browsers of client devices configured to remotely access different Web applications through the browsers, with the data being indicative of user actions performed within the different Web applications. The processor may also be configured to cooperate with the memory to generate a data structure separately from the different Web applications based upon the received data, determine an action to perform based upon the data structure, and perform the determined action.

16 Claims, 13 Drawing Sheets

(56) References Cited

U.S. PATENT DOCUMENTS

2019/0318100 A1* 10/2019 Bhatia ................. H04L 63/1425
2021/0397735 A1* 12/2021 Samatov .................. G08B 7/06

OTHER PUBLICATIONS

Kim et al: "Monitoring and detecting abnormal behavior in mobile cloud infrastructure" 2012 IEEE Network Operations and Management Symposium (NOMS 2012); IEEE, Piscataway, NJ. (Apr. 16, 2012), pp. 1303-1310.
U.S. Appl. No. 16/569,906, filed Sep. 13, 2019 Ricardo Fernando Feijoo.

* cited by examiner

SYSTEMS AND METHODS FOR GENERATING DATA STRUCTURES FROM BROWSER DATA TO DETERMINE AND INITIATE ACTIONS BASED THEREON

TECHNICAL FIELD

The present disclosure relates to web applications, and more particularly, to tracking actions performed within web applications.

BACKGROUND

Web applications or apps are software programs that run on a server and are accessed remotely by client devices through a Web browser. That is, while Web applications have a similar functionality to native applications installed directly on the client device, Web applications are instead installed and run on the server, and only the browser application is installed on the client device. Although in some implementations, a hosted browser running on a virtualization server may be used to access Web applications as well.

One advantage of using Web applications is that this allows client devices to run numerous different applications without having to install all of these applications on the client device. This may be particularly beneficial for thin client devices, which typically have reduced memory and processing capabilities. Moreover, updating Web applications may be easier than native applications, as updating is done at the server level rather than having to push out updates to numerous different types of client devices.

Software as a Service (SaaS) is a Web application licensing and delivery model in which applications are delivered remotely as a web-based service, typically on a subscription basis. SaaS is used for delivering several different types of business (and other) applications, including office, database, accounting, customer relation management (CRM), etc.

SUMMARY

A computing device may include a memory and a processor configured to cooperate with the memory to receive data from browsers of client devices configured to remotely access different Web applications through the browsers, with the data being indicative of user actions performed within the different Web applications. The processor may also be configured to cooperate with the memory to generate a data structure separately from the different Web applications based upon the received data, determine an action to perform based upon the data structure, and initiate the determined action.

In an example implementation, the processor may be further configured to detect a pattern of user actions for a given user based upon the data structure, and the determined action may comprise blocking access to at least one of the Web applications by client devices associated with the given user. In accordance with another example, the processor may be further configured to determine a pattern of user actions performed by a given user, and the determined action may comprise generating an alert identifying the given user. By way of example, the client devices may be associated with respective users, and the data structure may comprise a respective data structure for each user.

In another example implementation, the processor may be further configured to determine a common user action performed within a Web page of a given Web application based upon the data structure. Moreover, the determined action may comprise causing the browsers to display an overlay on the given Web application corresponding to the common user action when navigating the Web page, for example. In another example, the client devices may be associated with respective users, and the data structure may comprise a common data structure of user actions across the different users.

Furthermore, at least some of the Web applications may comprise Software as a Service (SaaS) applications, for example. Also by way of example, the browsers may comprise at least one of embedded browsers and hosted browsers.

A related method may include receiving data at a computing device from browsers of client devices configured to remotely access different Web applications through the browsers, with the data being indicative of user actions performed within the different Web applications. The method may further include generating a data structure at the computing device separately from the different Web applications based upon the received data, determining an action at the computing device to perform based upon the data structure, and initiating the determined action at the computing device.

A related computer system may include a plurality of client devices configured to remotely access a plurality of different Web applications via a browser. Further, at least one server may cooperate with the browsers to receive data from the browsers, with the data being indicative of user actions performed within the different Web applications, generate a data structure separately from the different Web applications based upon the received data, determine an action to perform based upon the data structure, and initiate the determined action.

DETAILED DESCRIPTION

With the large number of Web and Software as a Service (SaaS) applications (or apps) in use today, it may be difficult to properly audit changes that information technology (IT) administrators make in particular SaaS apps. Typically, the IT administrator will only have access to the auditing capabilities available within a particular app, and the type of auditing may vary from one application to another. More particularly, the auditing capabilities available within a given app may not be sufficient to provide IT administrators with all of the information they may want regarding actions being performed within the system, e.g., by users.

Still another technical challenge with such a large number of different Web/SaaS apps is that it may be difficult for users to understand the best way to perform an action in a particular Web/SaaS app or across different Web/SaaS apps. That is, it may not always be intuitive for users to determine how to perform desired actions as they navigate new or unfamiliar Web/SaaS apps.

The approach set forth herein advantageously allows for the collection of data corresponding to user actions across different Web/SaaS applications and different users to advantageously determine and perform appropriate actions accordingly. These actions may be monitored and logged independently or separately of the various apps (not within the apps themselves). Moreover, user behavior within a particular Web/SaaS app may be logged and analyzed to learn an appropriate path to perform a particular task, and also help guide subsequent users through the same process flow or provide alternative flows. In addition, the approach set forth herein advantageously allows for detecting certain patterns of user actions (e.g., unauthorized pattern of action and performing appropriate security functions based thereon.

Figure 1:
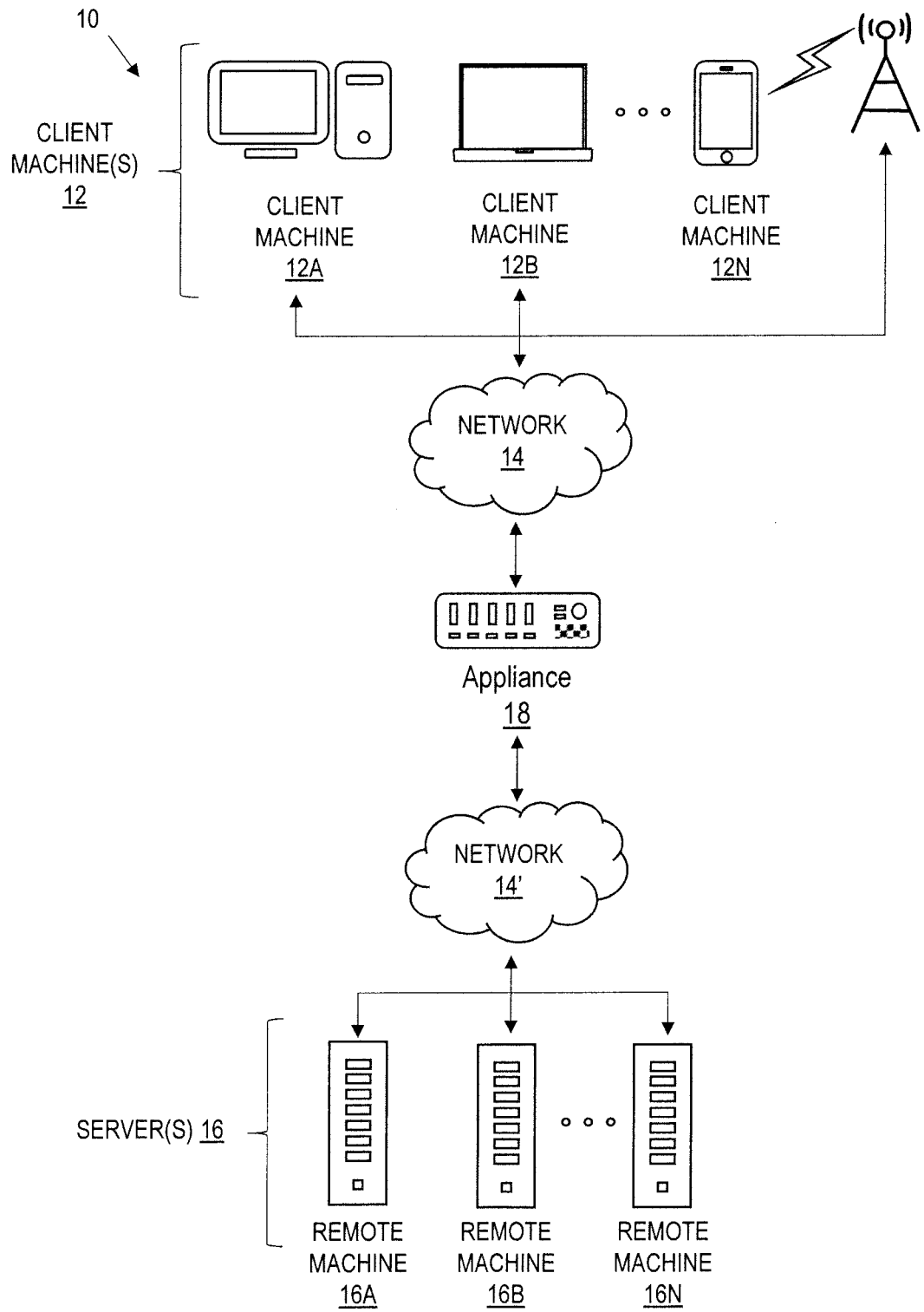
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 108 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
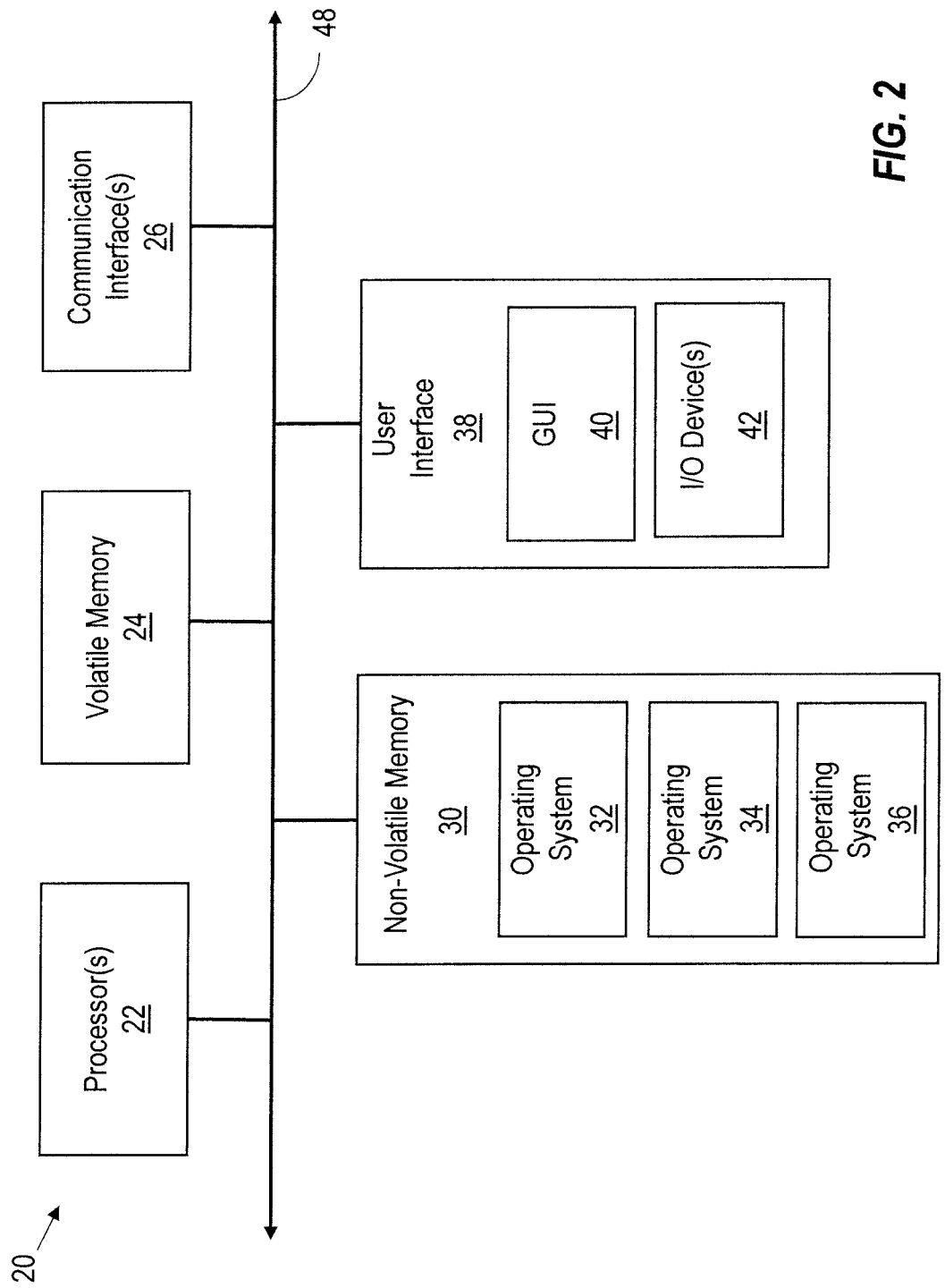
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Fla. ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
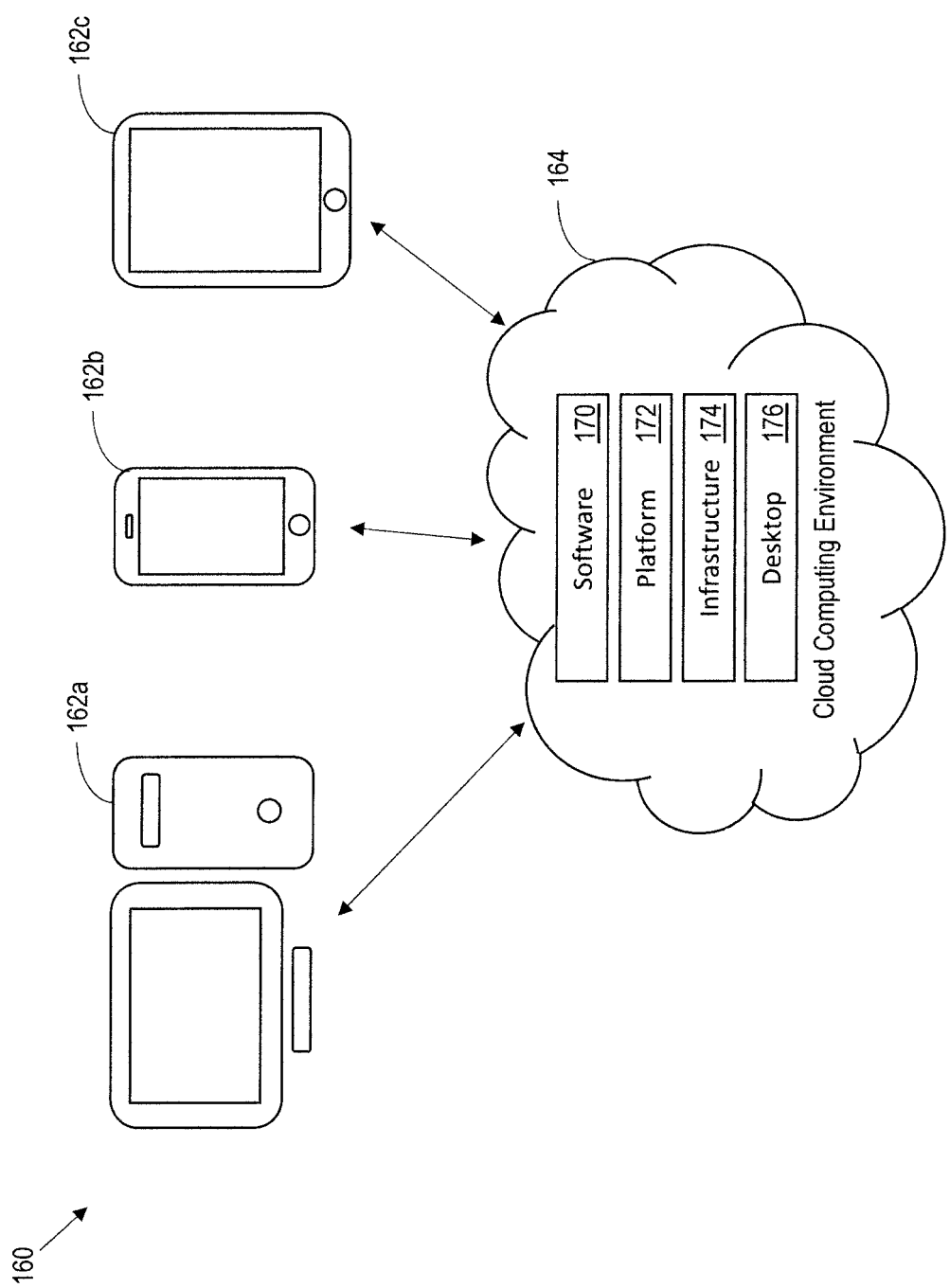
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
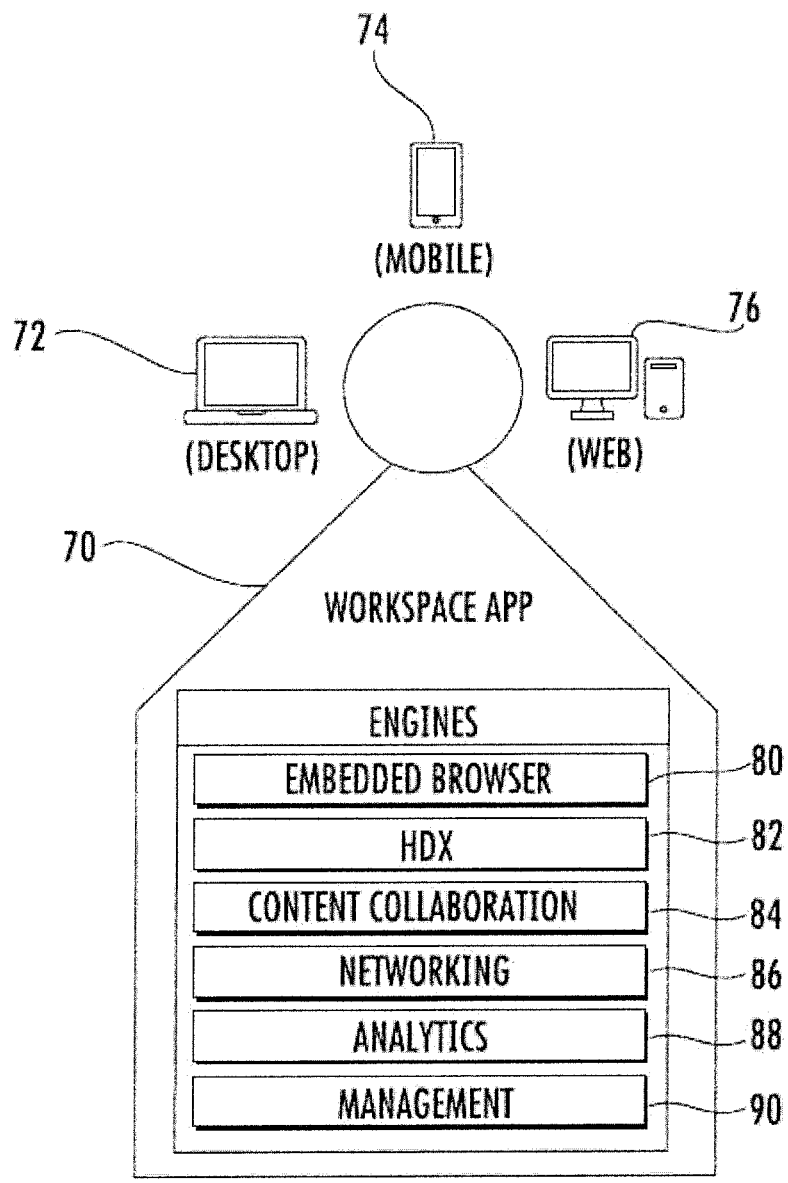
FIG. 4 is a schematic block diagram of desktop, mobile and web based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, Web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and Web apps contained within the workspace app 70 instead of launching them on a locally installed and unmanaged browser. With the embedded browser, the workspace app 70 is able to intercept user-selected hyperlinks in SaaS and Web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific μ-VPN connection. A μ-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
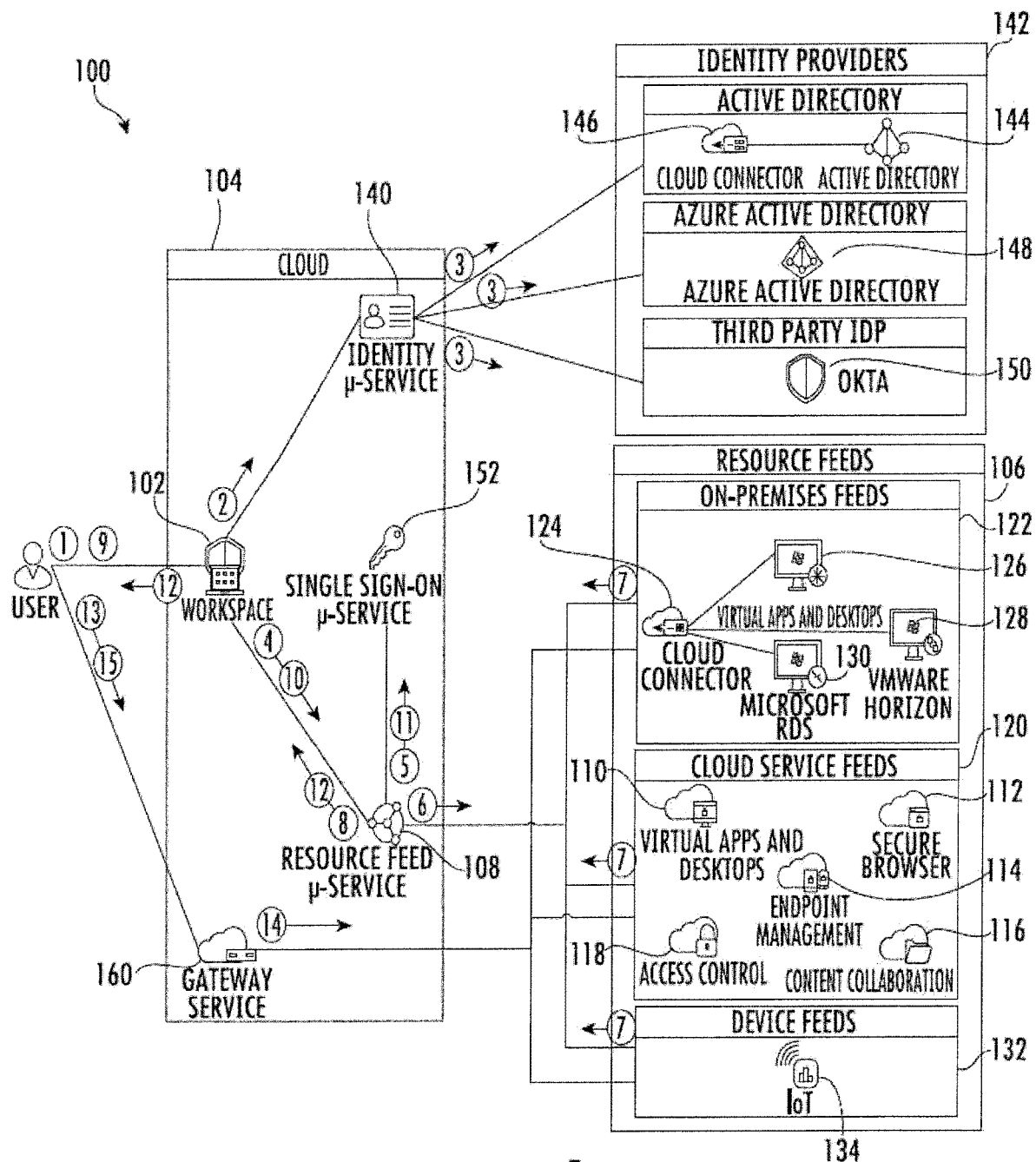
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Cloud 104. The workspace experience service 102 then pulls in all the different resource feeds 16 via a resource feed micro-service 108. That is, all the different resources from other services running in the Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Cloud 104, and presenting their identity (event 1). The identity includes a user name and password, for example.

The workspace experience service 102 forwards the user's identity to an identity micro-service 140 within the Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Figure 6:
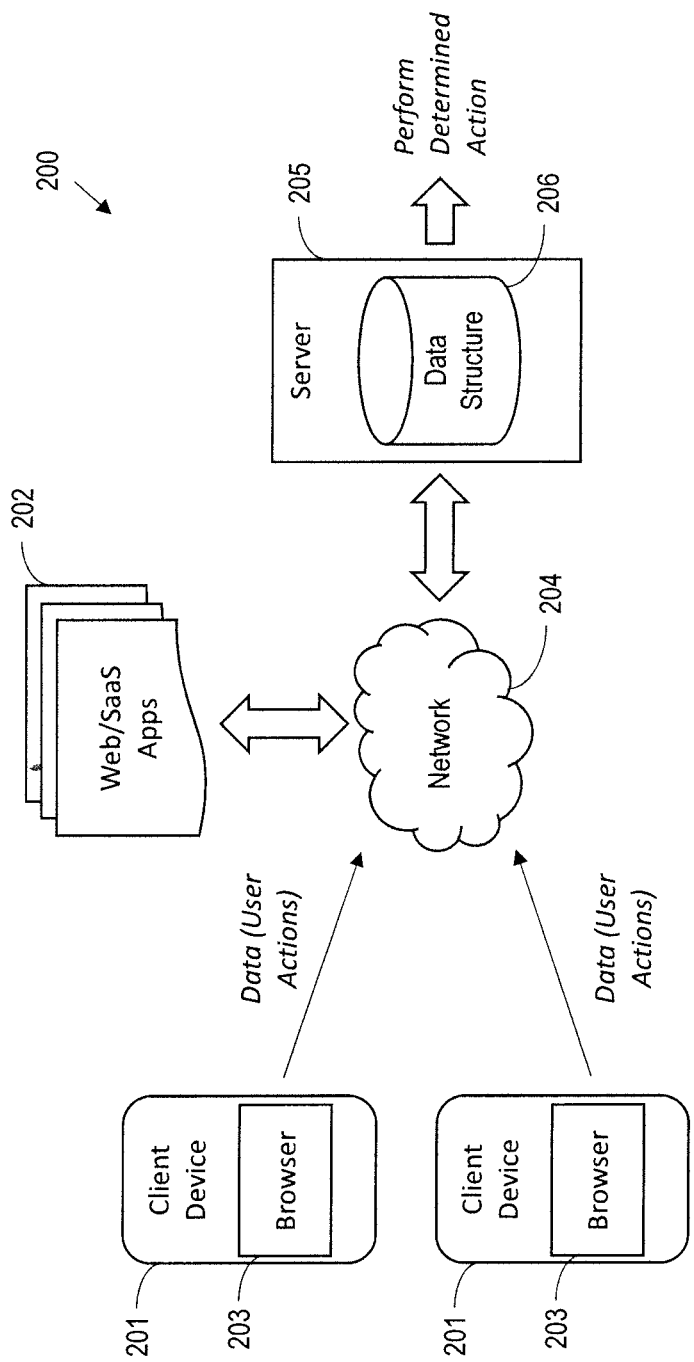
FIG. 6 is a is a schematic block diagram of a computing system which may monitor user actions across different Web applications in accordance with an example implementation.

Turning now to FIG. 6, a computing system 200 illustratively includes a plurality of client devices 201 (such as the devices 12A-N and 162a-162c described above) configured to remotely access a plurality of different Web applications (e.g., SaaS apps, etc.) 202 via respective browsers 203 over a network 204 (e.g., the Internet). Further, one or more servers 205 may cooperate with the browsers 203 to receive data from the browsers. More particularly, the data may be indicative of user actions performed within the different Web applications 202. The server 205 may generate a data structure 206 based upon the received data and independently or separately from the different Web/SaaS apps 202, determine an action to perform based upon the data structure, and perform the determined action, as will be discussed further below.

More particularly, in accordance with one example implementation the browser 203 may be an embedded browser running within the Citrix Workspace App (CWA), and the server 205 may be running Citrix Workspace, as described above, although other configurations (e.g., hosted browsers, etc.) may be used in different embodiments. In the case of Workspace, the actions being performed by users at the client devices 201 (e.g., text input, mouse/keypad input, menu item selection, etc.) may be collected by Workspace at the server 205. More particularly, the server 205 may perform data logging by collecting and storing the user action data over time so that it may be analyzed to detect various trends and/or to record various data-based events or actions occurring within the computing environment. Other information that may be collected from the browser 203 may include IP addresses, browser type, behavioral analytics on mouse and keyboard movement, etc.

More specifically, the published resources (e.g., Web/SaaS apps that are available to respective users based upon applicable information technology (IT) policy and/or licensing) for the users will be accessed through the browsers 203. In other words, the server 205 not only is aware of the published resources the client devices 201 are able to access, it also may control the embedded browsers 203 through which the client devices access these published resources. This, in turn, allows the server 205 to collect the user action data being generated through the browsers 203 across the various different Web/SaaS apps 202 that are run within the browsers. For example, this may take the form of commands (e.g., HyperText Transfer Protocol (HTTP), Extensible Markup Language (XML), etc.) corresponding to user input (e.g., text entry, mouse movement/clicks, etc.). As such, a more complete picture of the user actions across different Web/SaaS apps 202 may be determined, even down to specific pages or uniform resource locator (URL) addresses within different Web/SaaS apps.

Figure 7:
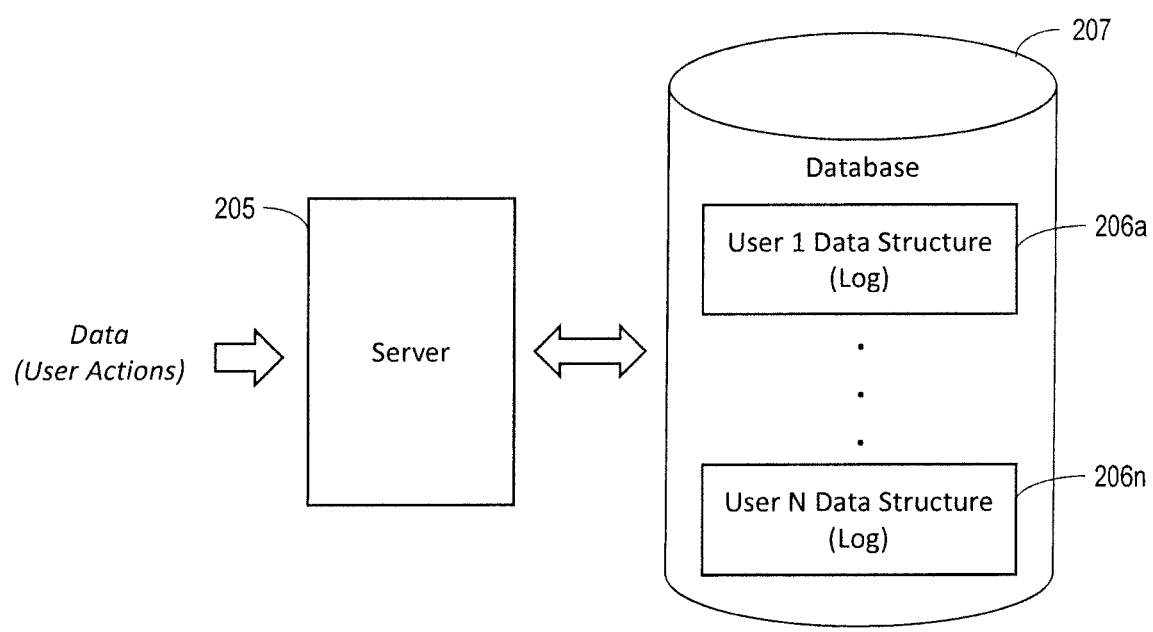
FIG. 7 is a schematic block diagram of an example implementation of the server of the system of FIG. 6 generating respective data structures for different users based upon user actions in accordance with an example implementation.

In the example of FIG. 7, this allows the server 205 to create a respective data structure or log 206a-206n for users including actions performed across the Web/SasS apps 202. The data logs 206a-206n may be stored within one or more databases 207, for example. As such, the server 205 may audit what a user is doing centrally across all of the different Web/SaaS apps 202. In some instances, the data logs 206a-206n may be used to keep track of which users are accessing various resources. However, the auditing may be used for security purposes to detect when users are engaging in certain patterns of activity that may be security risks or otherwise constitute unauthorized conduct, and may take appropriate action accordingly.

Figure 8:
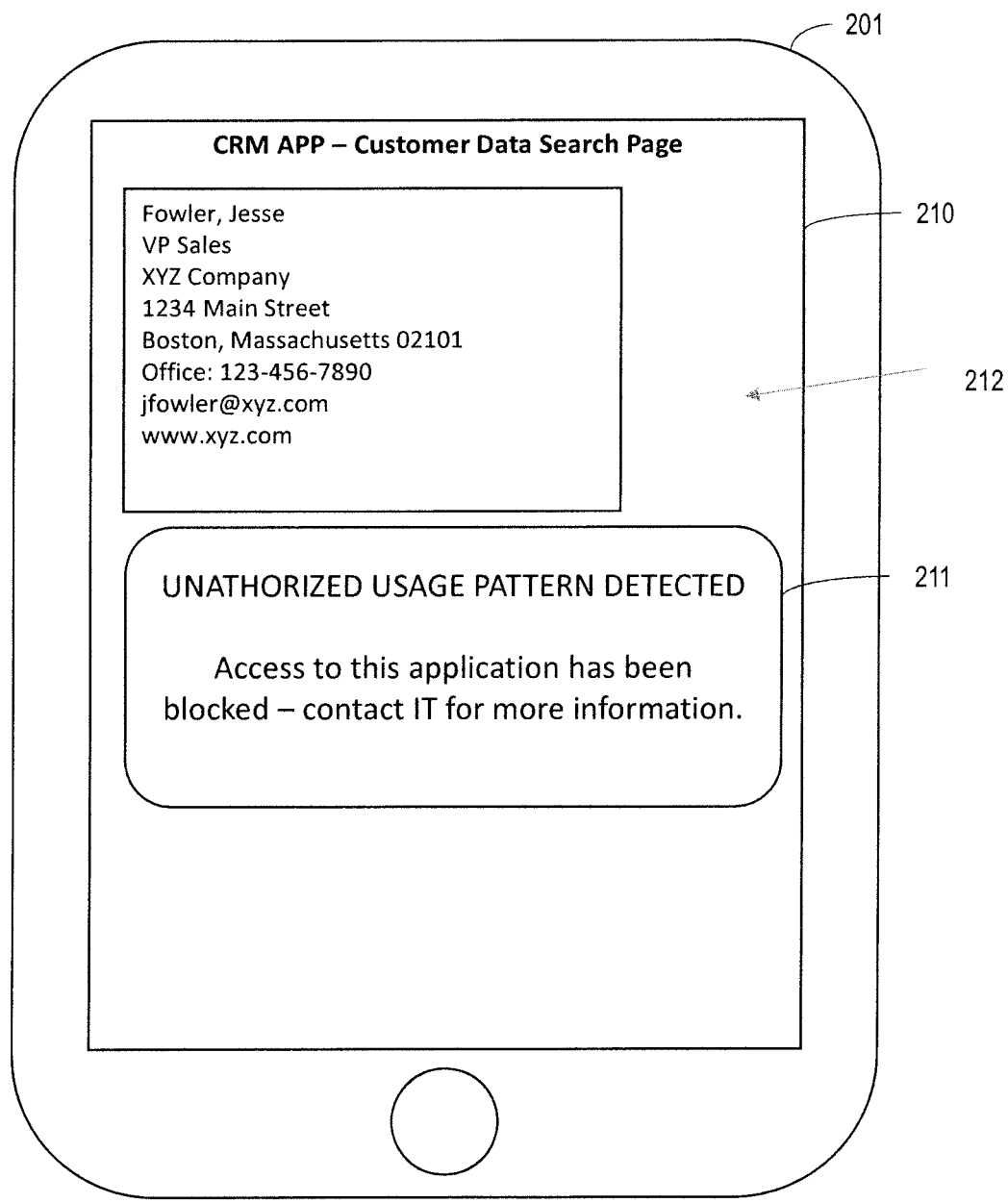
FIG. 8 is a display view illustrating an example use case of the configuration of FIG. 7 for determining a pattern of user actions and blocking access to a Web application(s) based thereon.

One such example is shown in FIG. 8, in which a display 210 on a client device 201 is shown. In this instance, the user is running a customer relationship management (CRM) SaaS app through its browser 203, and the server 205 detects that the user is performing repeated copy and/or paste operations (copying/pasting data to/from a digital clipboard) with respect to different record pages 212 within the CRM app. Such a pattern of actions can be indicative a user stealing sensitive enterprise client data in some instances, for example. As such, when a threshold amount of CRM entries have been copied (e.g., a certain number of contact entries are copied within a given period of time and pasted to another application such as a word processor, etc.), the server 205 will detect that the unauthorized copying usage pattern has occurred, and accordingly will block further access to the CRM app by the given user and/or the user's client devices 201. In other examples, user actions which may trigger an unauthorized usage pattern include screen shots/print screen, deleting files, etc.

Moreover, in the present example, the server 205 causes the browser 203 to display an alert message 211 as an overlay within the CRM app, informing the user that the unauthorized pattern of activity has been detected and that access to the application has been blocked, as well as a note to contact IT personnel for further information. In some embodiments, the user may be blocked from other applications or computing resources (files, databases, etc.) as well, if desired. The server 205 may automatically block access by the client device 201, or provide an alert to IT personnel to review and manually block the activity if desired, as will be discussed further below. That is, because the browser 203 is controlled by the server 205, it may create overlays to be displayed on top of the Web/SaaS applications 202 running therein, similar to a watermark, for example.

Figure 9:
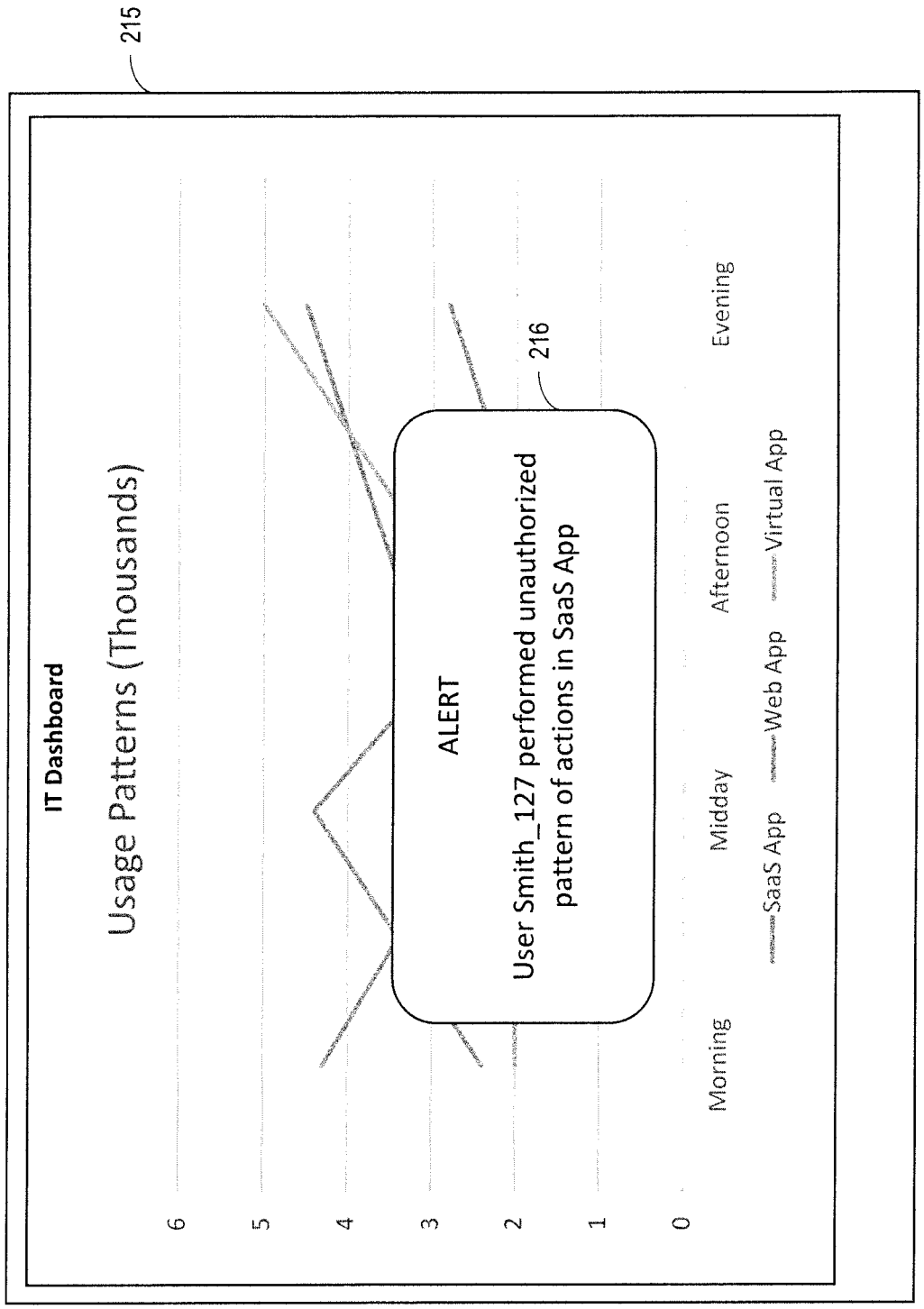
FIG. 9 is a display view illustrating an example use case of the configuration of FIG. 7 for determining a pattern of user actions and generating an alert based thereon.

Another example alert is shown in FIG. 9. Here, an IT administrator is viewing an IT Dashboard app on a display 215 which, among other functions, allows for monitoring of user usage patterns. An alert message 216 is generated and presented on the display 215 identifying the issue and the associated user, which again may be a pop up or overlay on the IT Dashboard app to inform the IT administrator that a user (User Smith_127) has performed a pattern of unauthorized actions in a given SaaS app, such as the unauthorized copy/paste pattern example noted above. It should be noted that various other actions may also be performed based upon the detection of an unauthorized usage pattern, such as automatically sending an email to a user, IT manager, etc.

The system 200 therefore advantageously provides an auditing capability across multiple different Web/SaaS apps 202, whether the apps have an individual auditing capability or not. That is, the sever 205 may advantageously provide auditing of user action irrespective and independently of/separately from whether the application has any auditing capabilities. Moreover, it allows for the tracking of actions that transcend different Web/SaaS apps 202. For example, in the above-noted case of copying records from a first app and pasting them to a second app, an auditing function in the first app (if available) would not be able to determine if or where copied data is being pasted. However, the server 205 may advantageously track all of these patterns because it is collecting user action data across multiple Web/SaaS apps 202 running within the browsers 203 (e.g., both the app from which the data was copied and the app into which the data is copied) and it is doing so independently of/separately from the Web/SaaS apps. That is, the Web/SaaS apps 202 typically run on separate servers responsive to the user input data, while the server 205 both logs this data and takes action responsive thereto independently of what the Web/SaaS apps are doing. In an example implementation, the server 205 may track user actions for a given enterprise (e.g., corporation, government organization, etc.), and the patterns of user actions that would trigger an alert/action may be set or selected by IT personnel for the given enterprise. In this respect, the patterns of user action may be customizable for different implementations as desired.

Figure 10:
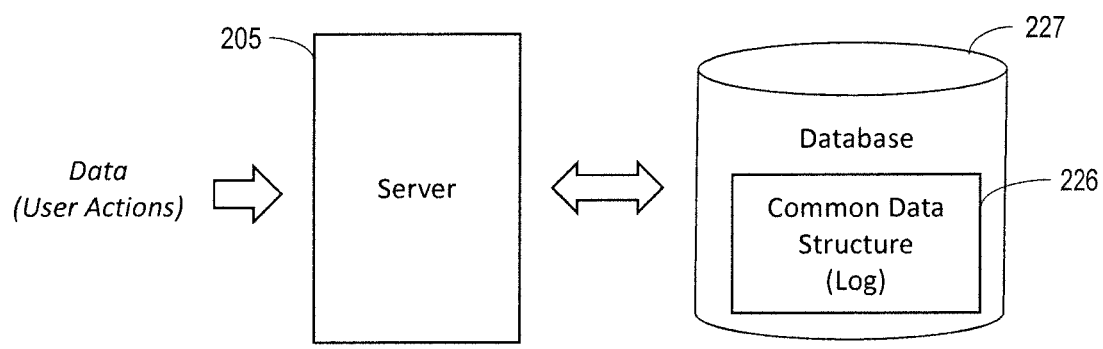
FIG. 10 is a schematic block diagram of an example implementation of the server of the system of FIG. 6 generating a common data structure based upon actions from different users across different Web application in accordance with an example implementation.
Figure 11:
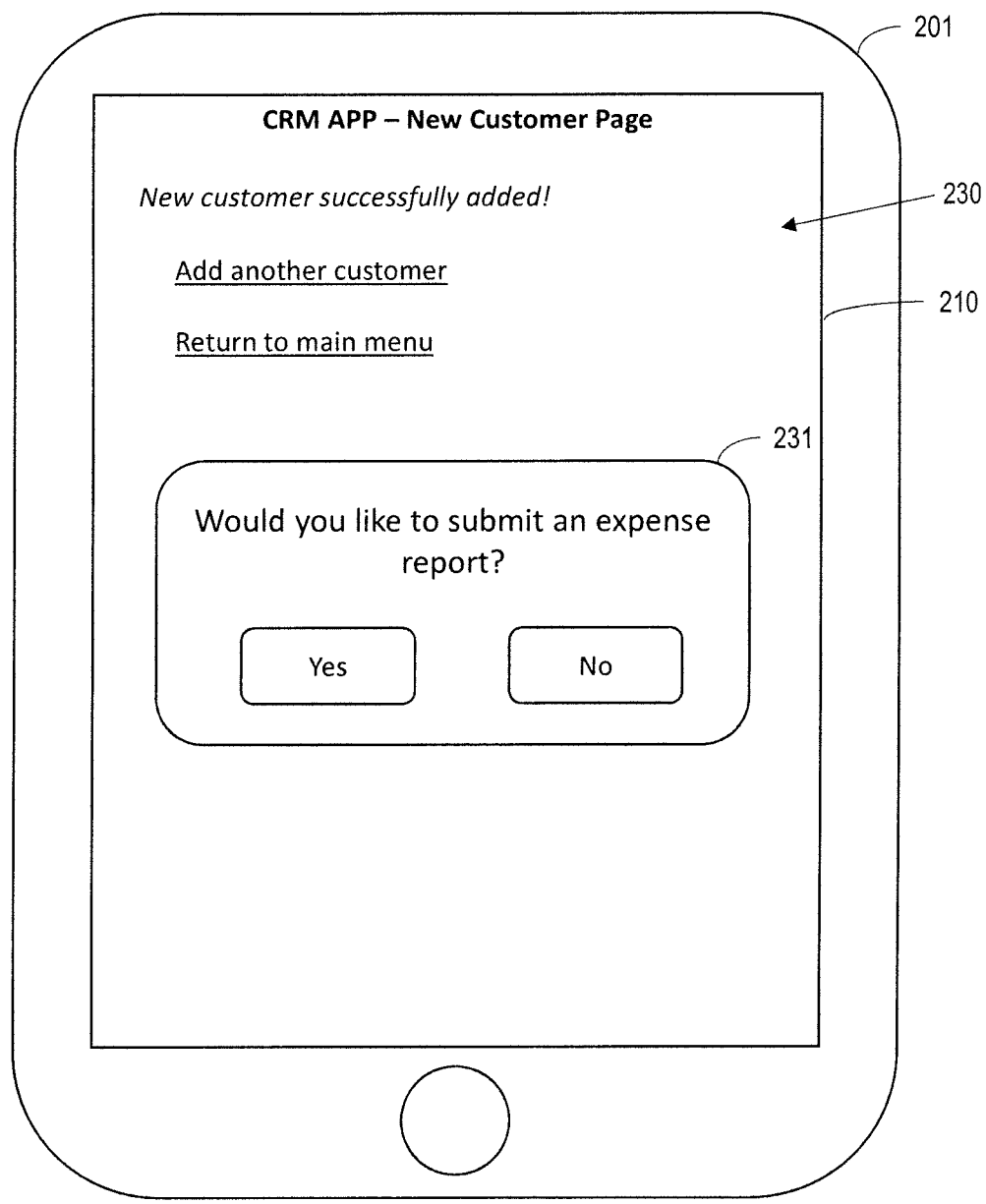
FIGS. 11-12 are a series of display views illustrating an example use case of the configuration of FIG. 10 for determining a common user action performed within a Web page of given application and displaying an overly on the Web page within the browser based thereon.
Figure 12:
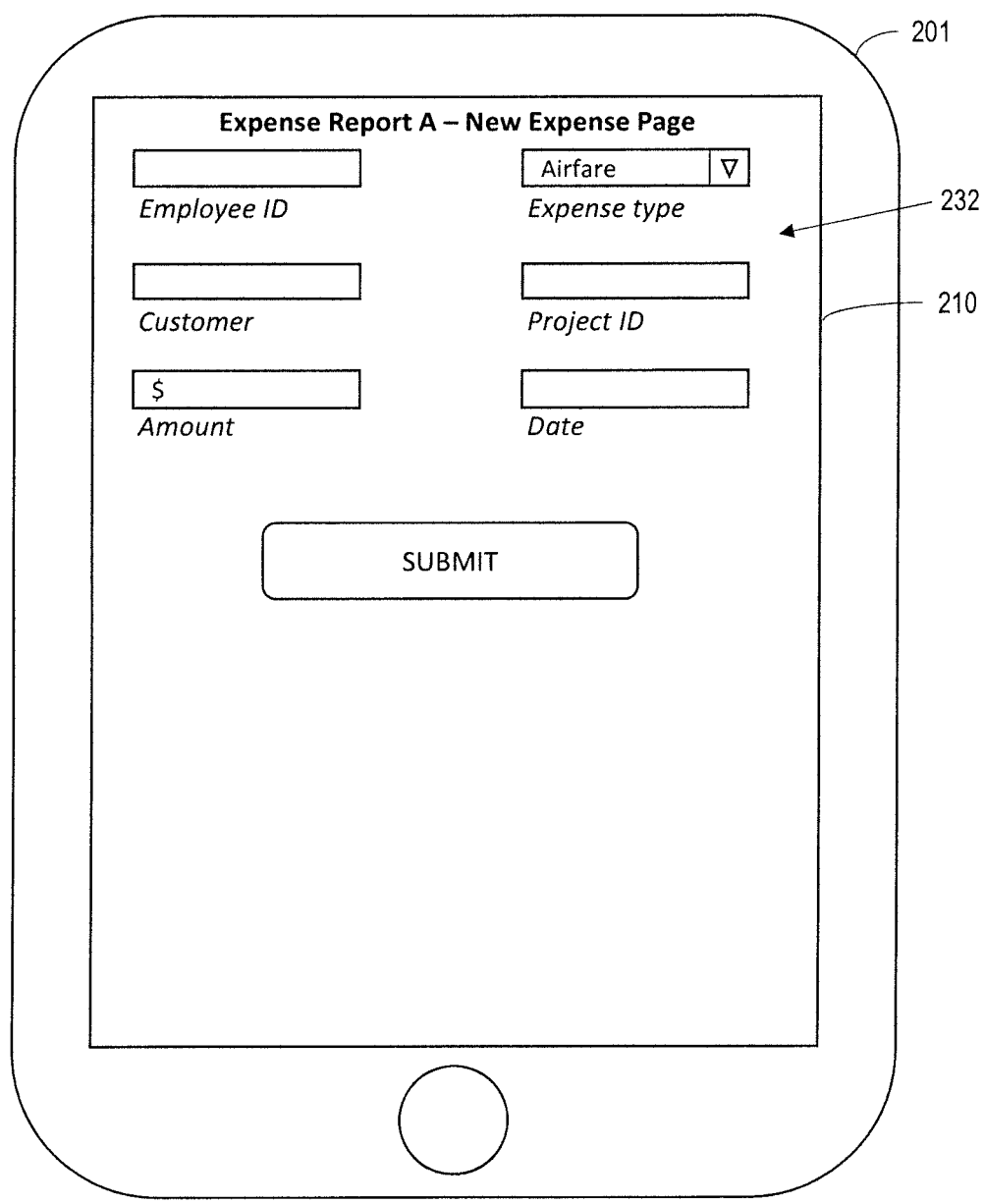

Referring additionally to FIGS. 10-12, in other example implementations the server 205 may generate a common data structure 226 within a database 227 for logging user actions across multiple users. More particularly, the user base may correspond to a single enterprise, or it may extend across multiple enterprises. This allows the server 205 to detect patterns within the various Web/SaaS apps 202 from the recurring actions of multiple users. Generally speaking, since the server 205 is learning from community behavior in this scenario, the larger the community the more accurate the determination of different patterns that can be made, but again this approach may be used with user bases of different sizes.

In the examples of FIGS. 11 and 12, it has been determined that a significant number of users upon adding a new customer on a new customer page 230 of a CRM SaaS app will next attempt to submit an expense report through a new expense page 232 of an expense report SaaS app. For example, this may occur after a sales representative returns from a business meeting with a new client. As seen in FIG. 11, the CRM app does not provide the user with an option to switch to the expense report app. In fact, the CRM app and the expense report app may be from completely different app providers, and thus the CRM app would not have the capability to direct a user to the expense report app unless specifically programmed to do so.

However, because the server 205 monitors the Web/SaaS applications 202 and logs user actions across the different apps, such as navigating to the new expense page 232 of the expense report app following the submission of a new customer record on the new customer page 230 of the CRM app, the server 205 is able to learn the typical or optimal paths through the application task flow. In the present example, that is to navigate to the new expense page 232 within the expense report app.

To this end, the server 205 may once again display a pop up message 231 as an overlay on the new customer page 230 of the CRM app. The pop up message 231 asks the user if he wants to submit an expense report, and gives clickable buttons for "yes" and "no" responses. With a "no" response, the browser 203 removes the pop up message 231 and remains on the new customer page 230 awaiting further input from the user. With a "yes" response, the browser 203 cooperates with the server 205 to re-direct the user to the new expense page 232 of the expense report app, as shown in FIG. 12. The server 205 may then continue to guide new users, and continue to learn in a closed loop manner. This may also be helpful for existing users who have never performed a task before, or take a longer time to perform a task than others, in which case the server 205 can provide an appropriate recommendation based upon the previously learned patterns. If desired, the user could be automatically directed back to the prior page after submission of the expense, or there could be a "back button" or similar option, for example.

It will be appreciated that foregoing is but one example of different patterns that the server 205 may learn to help streamline user workflows and improve user experience. In addition to workflows across multiple applications, the server may also detect user action patterns within a same (single) Web/SaaS app 202 as well. By way of example, the server 205 may employ various machine learning approaches for determining the different patterns, which may be supervised or unsupervised. Example machine learning approaches may include feature learning, neural networks, dictionary learning, association rules, decision trees, etc.

Figure 13:
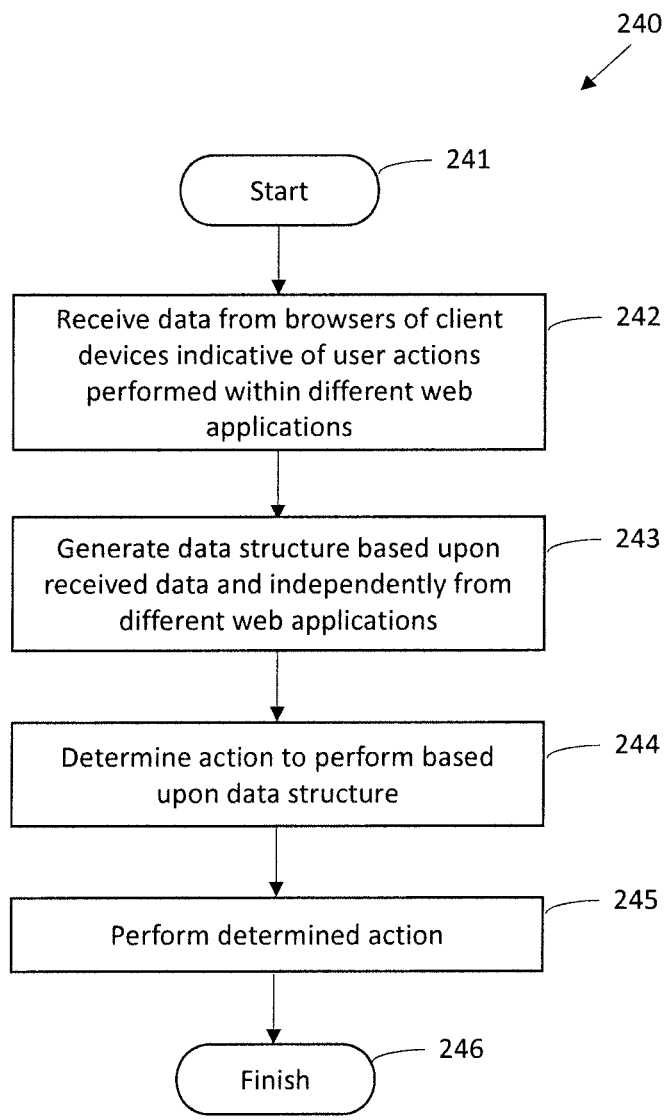
FIG. 13 is a flow diagram illustrating method aspects associated with the system of FIG. 6 in accordance with an example embodiment.

Referring additionally to the flow diagram 240 of FIG. 13, a related method is now described. Beginning at Block 241, data is received at a computing device (e.g., the server 205) from the browsers 203 of the client devices 201 which are configured to remotely access different Web applications (e.g. the Web/SaaS apps 202) through the browsers, at Block 242, as discussed further above. Again, the data is indicative of user actions performed within the different Web/SaaS apps 202. The method further includes generating a data structure 206 at the server 205 separately from the different Web applications based upon the received data, at Block 243. The method also illustratively includes determining an action at the server 205 to perform based upon the data structure, at Block 244, and initiating the determined action at the computing device (Block 245), as also discussed further above. The method of FIG. 13 illustratively concludes at Block 246.

As will be appreciated by one of skill in the art upon reading the foregoing disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A computing device comprising:
a memory and a processor configured to cooperate with the memory to
log user input data collected by and reported from browsers of client devices that remotely access different Web applications through the browsers, the user input data being indicative of user actions performed with use of the different Web applications, and the logging being done separate from execution of the different Web applications,
detect a pattern of unauthorized usage based on logged user input data indicative of a frequency of which user actions are repeated via one or more client devices for at least one Web application,
block further access to the at least one Web application by the one or more client devices responsive to detection of the pattern,
cause a first overlay to be generated independently of the at least one Web application and displayed within the browser of the one or more client devices corresponding to the pattern of unauthorized usage,
determine a first action performed by a plurality of different users at their respective client devices within a Web page of the at least one Web application based upon the logged user input data from the client devices, and a second action performed by the plurality of different users at their respective client devices in another Web application different than the at least one Web application following the first action, and
responsive to a given user performing the first action within the Web page of the at least one Web application, cause a second overlay to be generated independently of the at least one Web application and displayed within the browser at the given user's respective client device including an option to switch to the other Web application to perform the second action.

2. The computing device of claim 1 wherein the processor is further configured to block further access to the at least one Web application by a user associated with the one or more client devices.

3. The computing device of claim 2 wherein the processor is further configured generate an alert identifying the user associated with the one or more client devices.

4. The computing device of claim 1 wherein the client devices are associated with respective users; and wherein the processor is configured to log respective user input data for each user.

5. The computing device of claim 1 wherein the client devices are associated with respective users; and wherein the processor logs common user input data of user actions across the different users.

6. The computing device of claim 1 wherein at least some of the Web applications comprises Software as a Service (SaaS) applications.

7. The computing device of claim 1 wherein the browsers comprise at least one of embedded browsers and hosted browsers.

8. The computing device of claim 1 wherein the processor is configured to automatically detect the pattern of unauthorized usage using machine learning based on the logged user input data indicative of the frequency of which the user actions are repeated via one or more client devices for the at least one Web application.

9. A method comprising:
logging user input data at a computing device collected by and reported from browsers of client devices that remotely access different Web applications through the browsers, the user input data being indicative of user actions performed with use of the different Web applications, and the logging being done separate from execution of the different Web applications;
detecting a pattern of unauthorized usage at the computing device based on logged user input data indicative of a frequency of which user actions are repeated via one or more client devices for at least one Web application;
blocking further access to the at least one Web application at the computing device by the one or more client devices responsive to detection of the pattern,
causing a first overlay to be generated independently of the at least one Web application and displayed within the browser of the one or more client devices corresponding to the pattern of unauthorized usage,
determining a first action performed by a plurality of different users at their respective client devices within a Web page of the at least one Web application based upon the logged user input data from the client devices, and a second action performed by the plurality of different users at their respective client devices in another Web application different than the at least one Web application following the first action, and
responsive to a given user performing the first action within the Web page of the at least one Web application, causing a second overlay to be generated independently of the at least one Web application and displayed within the browser at the given user's respective client device including an option to switch to the other Web application to perform the second action.

10. The method of claim 9 wherein blocking comprises blocking further access to the at least one Web application by a user associated with the one or more client devices.

11. The method of claim 10 further comprising generating an alert identifying the user associated with the one or more client devices at the computing device.

12. The method of claim 9 wherein the client devices are associated with respective users; and further comprising logging respective user input data for each user.

13. A computer system comprising:
a plurality of client devices that remotely access a plurality of different Web applications through browsers; and
at least one server cooperating with the browsers to
log user input data collected by and reported from browsers of client devices that remotely access different Web applications through the browsers, the user input data being indicative of user actions performed with use of the different Web applications, and the logging being done separate from execution of the different Web applications,
detect a pattern of unauthorized usage based on logged user input data indicative of a frequency of which user actions are repeated via one or more client devices for at least one Web application,
block further access to the at least one Web application by the one or more client devices responsive to detection of the pattern, and
cause a first overlay to be generated independently of the at least one Web application and displayed within the browser of the one or more client devices corresponding to the pattern of unauthorized usage,
determine a first action performed by a plurality of different users at their respective client devices within a Web page of the at least one Web application based upon the logged user input data from the client devices, and a second action performed by the plurality of different users at their respective client devices in another Web application different than the at least one Web application following the first action, and
responsive to a given user performing the first action within the Web page of the at least one Web application, cause a second overlay to be generated independently of the at least one Web application and displayed within the browser at the given user's respective client device including an option to switch to the other Web application to perform the second action.

14. The computer system of claim 13 wherein the at least one server is further configured to block further access to the at least one Web application by a user associated with the one or more client devices.

15. The computer system of claim 14 wherein the at least one server is further configured to generate an alert identifying the user associated with the given client device.

16. The computer system of claim 13 wherein the client devices are associated with respective users; and wherein the at least one server is configured to log respective user input data for each user.

* * * * *